US005416808A

United States Patent [19]

Witsaman et al.

[11] Patent Number: 5,416,808

[45] Date of Patent: May 16, 1995

[54] APPARATUS FOR SYNCHRONIZING A PLURALITY OF CLOCKS IN A SIMULCAST NETWORK TO A REFERENCE CLOCK

[75] Inventors: Mark L. Witsaman; David W. Glessner; Roger E. Benz; Joel R. Crowley-Dierks, all of Quincy, Ill.

[73] Assignee: Glenayre Electronics, Inc., Charlotte, N.C.

[21] Appl. No.: 222,323

[22] Filed: Apr. 4, 1994

Related U.S. Application Data

[63] Continuation of Ser. No. 861,248, Mar. 31, 1992, abandoned.

[51] Int. Cl.[6] .................... H04L 7/00

[52] U.S. Cl. .................... 375/350; 455/51.2

[58] Field of Search .................... 375/107, 106, 108, 111, 375/113, 4, 119, 120; 370/104.1; 455/51.1, 51.2, 12.1, 13.2

[56] References Cited

U.S. PATENT DOCUMENTS

| | | | |
|---|---|---|---|
| 4,607,257 | 8/1986 | Noguchi | 375/107 |
| 4,709,402 | 11/1987 | Akerberg | 455/51 |
| 4,815,110 | 3/1989 | Benson et al. | 375/107 |
| 4,843,617 | 6/1989 | Marshall et al. | 375/118 |
| 4,849,993 | 7/1989 | Johnson et al. | 375/108 |
| 4,850,032 | 7/1989 | Freeburg | 455/51 |
| 4,968,966 | 11/1990 | Jasinski et al. | 340/825.44 |
| 5,023,900 | 6/1991 | Tayloe et al. | 379/32 |
| 5,060,240 | 10/1991 | Erickson et al. | 375/38 |
| 5,077,759 | 12/1991 | Nakahara | 345/107 |
| 5,090,025 | 2/1992 | Marshall et al. | 375/4 |
| 5,125,009 | 6/1992 | DeVibiss | 375/107 |
| 5,153,874 | 10/1992 | Kohno | 370/13 |
| 5,162,790 | 11/1992 | Jasinski | 340/825.44 |
| 5,220,676 | 6/1993 | LoGalbo et al. | 455/51.2 |
| 5,257,404 | 10/1993 | Goreham et al. | 455/51.2 |

FOREIGN PATENT DOCUMENTS

| | | |
|---|---|---|
| 1-228237 | 9/1989 | Japan . |
| 4-70027 | 3/1992 | Japan . |
| WO92/03880 | 3/1992 | WIPO . |

*Primary Examiner*—Stephen Chin
*Assistant Examiner*—Hai H. Phan
*Attorney, Agent, or Firm*—Christensen, O'Connor, Johnson & Kindness

[57] ABSTRACT

A clock synchronization system for synchronizing the performance of a number of clocks (46) so that they run parallel with a reference clock is disclosed. Each clock of this synchronization system includes a counter (52) that indicates the current time and that is sequentially incremented by a counter advance signal applied thereto. A time counter controller (54) both initializes the counter and generates the clocking signal that controls the advancement of the counter. The time counter controller further monitors the time indicated by the counter and compares it to a reference-time signal received from a reference clock. Based on the comparison, the time counter controller selectively reinitializes the counter and adjusts the rate at which the clocking signal is applied to the counter so as to ensure that the counter advances at a rate equal to the rate at which the reference clock advances. In some versions of the invention, the comparison of the reference-time signal to the actual clock counter time is made at a maintenance operation point (58) remote from the clock. In these versions of the invention, the maintenance operation point reports the difference in the two times back to the time counter controller, which, in turn, makes the appropriate adjustments to the counter and to the clocking signal.

10 Claims, 6 Drawing Sheets

APPARATUS FOR SYNCHRONIZING A PLURALITY OF CLOCKS IN A SIMULCAST NETWORK TO A REFERENCE CLOCK

This application is a continuation application based on prior application Ser. No. 07/861,248, filed Mar. 31, 1992, now abandoned.

FIELD OF THE INVENTION

This invention relates generally to a system for synchronizing a number of timers, or clocks, so that each indicates exactly the same time and, more particularly, to a system for synchronizing a set of clocks that are spaced over a wide geographic area.

BACKGROUND OF THE INVENTION

Many modern communications and measuring systems are assembled from a number of smaller subsystems or stations that are geographically spaced from each other and that are arranged to work together. One such system is a paging system that typically comprises a paging terminal, a paging system controller, and a number of transmitter units, called paging stations, that are located over a wide geographic area. The paging terminal is connected to the publicly switched telephone network and receives incoming calls to the system subscribers. In response to a call, the paging terminal formulates a page for the subscriber and forwards the page to the stations through the paging system controller. The paging stations, upon receipt of the page, broadcast it over their transmitting equipment. The subscriber's pager, which is a small receiver, picks up the broadcasts and, by the actuation of a display or generation of an audio tone, notifies the subscriber that he/she has been paged. Other types of multistation systems are data acquisition systems that include a number of monitoring sites for measuring a particular parameter, such as wind or seismic motion. Moreover, telemetry systems, which are systems used to obtain data and forward it to distant locations, often are comprised of spaced-apart subsystems that are designed to act together.

For many multistation communications and measuring systems to function properly, each station must include a control clock, or timer, and all the clocks must be synchronized. In other words, each of the clocks must, at the same moment, indicate the same time. For example, one paging system is arranged so that the paging system controller collects a number of pages, bundles them together in a packet, and then forwards the packet to the paging stations along with an instruction indicating when the packet should be broadcast. The paging stations then broadcast the packet of pages at the time indicated in the instruction. As long as all the stations broadcast the packet at the exact same time, pagers carried by system subscribers who are in areas where pages from two or more stations can be received will essentially receive a single signal that the pagers' circuitry can readily process. However, if the pages are broadcast at different times, the pagers will receive multiple, overlapping signals that cannot be processed. As a result, when a subscriber carries a pager into one of these signal overlap zones, it becomes, in effect, useless. In order to avoid this undesirable result, it is desirable for all the paging stations to have clocks that indicate the same time so that each station transmits the same packet of pages at the same time.

To date, it has proved difficult to provide a set of spaced-apart locations, such as paging stations, with clocks that are all in synchronization. The individual stations can be provided with very accurate crystal-controlled clocks that are periodically synchronized to a common reference time. A disadvantage of this practice is that the high-accuracy crystal-controlled clocks are very expensive. Moreover, even if these clocks are provided, it is still necessary to provide some type of synchronization equipment at each clock site in order to ensure that all the clocks run at the same rate. Furthermore, it is typically necessary that the synchronization of these clocks be performed by a technician who visits the clock site. The expenses associated with having personnel make such visits often means that such synchronization occurs at a less than optimal frequency.

Other attempts at providing a multiclock synchronization system have involved providing a master unit that generates a continuous reference signal and a set of clock drive circuits that use the reference signal to regulate the advancement of the clock units associated therewith. Typically, the reference signal is some type of AC signal and the clock drive circuits employ phase-locked loop subcircuits to regulate the advancement of clock advance signals. A disadvantage of these systems is that it has proved difficult to continually forward a reference signal to the individual clock sites. Given the scarcity of unassigned radio frequencies, there are many locations where it is essentially impossible to establish a radio link for generating such a reference signal. In these locations it would be necessary to forward the signal by a land link, such as a conventional wire line or a fiber-optic transmission link. While such lines can readily be used to forward a reference signal, the cost of connecting them to many locations can be expensive. As the number of clock sites intended to be synchronized increases, the expense of providing such a hard wire link can grow to the point of being cost prohibitive. Moreover, many of these systems require that the individual stations receive the signals in a specific phase relationship to each other. When the signal is transmitted to the individual stations over the publicly switched telephone network, the carrier may, from time to time, modify the routing of the signal to the individual stations. The inherent change in signal propagation time to the individual stations results in the phase relationship of the signal received at the station to shift. This necessitates having to adjust the processing equipment at the station in order to ensure that the signal is processed in the appropriate phase relationship.

Still another disadvantage of many current clock synchronization systems is that they are not well suited for use at clock sites that the user wants to establish only on a temporary basis or for use with a portable clock. Owing to their sensitivity, crystal-controlled clocks must be recalibrated, their frequency reset, each time they are set up. Moreover, owing to their size and power requirements, they do not lend themselves to installation in a portable housing, such as an instrument truck. Clocks controlled by constant-reference signals have similar problems. These clocks cannot be moved unless there is some assurance that the clock drive circuits will always be able to receive the requisite reference signals. It has proved very difficult to continually provide these signals, either when the clock is moved from site to site or when the clock is actually in motion.

SUMMARY OF THE INVENTION

This invention relates generally to a clock synchronization system for synchronizing a number of timers or clocks, so that at the same instant each clock indicates the same time. More particularly, this invention is directed to a clock synchronization system wherein each clock includes a counter that is driven, advanced, by a periodically generated clocking signal. Each clock further includes a time counter controller that sets the initial state, the initial time, of the counter and that also selectively generates the clocking signal to regulate the advancement of the time indicated by the counter. The time counter controller establishes the initial counter setting and controls the frequency of the clocking signal by referring to a reference time from an external source.

In some preferred embodiments of this invention, the individual time counter controllers compare their associated counter indications with reference time signals received directly from a reference clock. Once such signal source is a global positioning system satellite. These satellites transmit a very accurate time signal that can readily be received by large numbers of remote stations that are located over large geographic areas. It is also possible to compare the station clock times of one or more stations to the reference time maintained by a single maintenance operation point. In these versions of the invention, the actual time comparison takes place at the maintenance operation point. After the comparison takes place, processing circuitry at the maintenance operation point then informs the time counter controller of the difference between the reference time and the clock time. The time counter controller uses this information to reset the clock's initial state and the clocking signal. Regardless of the specific source, each reference time/clock time comparison is made with respect to a single reference signal. Consequently, all the clocks in the system will be in synchronization with each other.

The clock synchronization system of this invention provides a convenient means to ensure that one or more clocks are running in parallel with a remote reference timer. The individual clock units receive the reference signal through readily established radio links to ever-present reference clocks, the satellites and/or local maintenance operation points. Only a relatively few components are needed to provide the timing control circuit that both initializes the counter and controls the rate at which it advances. Thus, the minimal site hardware and signal linkage component requirements make it relatively economical to provide this synchronization system.

Still another advantage of this system is that additional clocks can be added without having to disrupt or adjust for the clocks already connected to the system. Furthermore, given that each clock site has only a few relatively small components, these components have relatively low power requirements, and reference time signals can almost always be received, the system of this invention is well suited to provide accurate clocks that can be readily moved from site to site and that can even be used to provide a synchronized time signal while in motion.

Moreover, the signals generated by the individual time counter controllers of this invention can be applied to the transmitters with which they are associated to serve as reference signals to establish the transmitters' carder frequencies. In some preferred embodiments of the invention, the time counter controllers can be adjusted so that the signals generated by the individual controllers will be slightly offset from each other. This will cause the associated transmitters to broadcast pages or other signals at carrier frequencies that are slightly offset from each other. This difference in carder frequencies prevents the development of static null regions where, due to precisely out-of-phase signals from multiple transmitters, a receiver may not pick up a single, processable signal. In these embodiments of the invention, the time counter controller is further set to periodically advance or decrement the counter to compensate for a clocking signal-triggered advancement of the counter that is either above or below the desired clocking rate.

In an alternative preferred embodiment of the invention, the counter is merely an elapsed-time counter. In this embodiment of the invention, the time counter controller maintains a counter offset value, which it adds to the time count from the counter to determine the actual time. Clocks of this embodiment of the invention are synchronized by both periodically adjusting the frequency of the clocking signal and by resetting the counter offset value.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
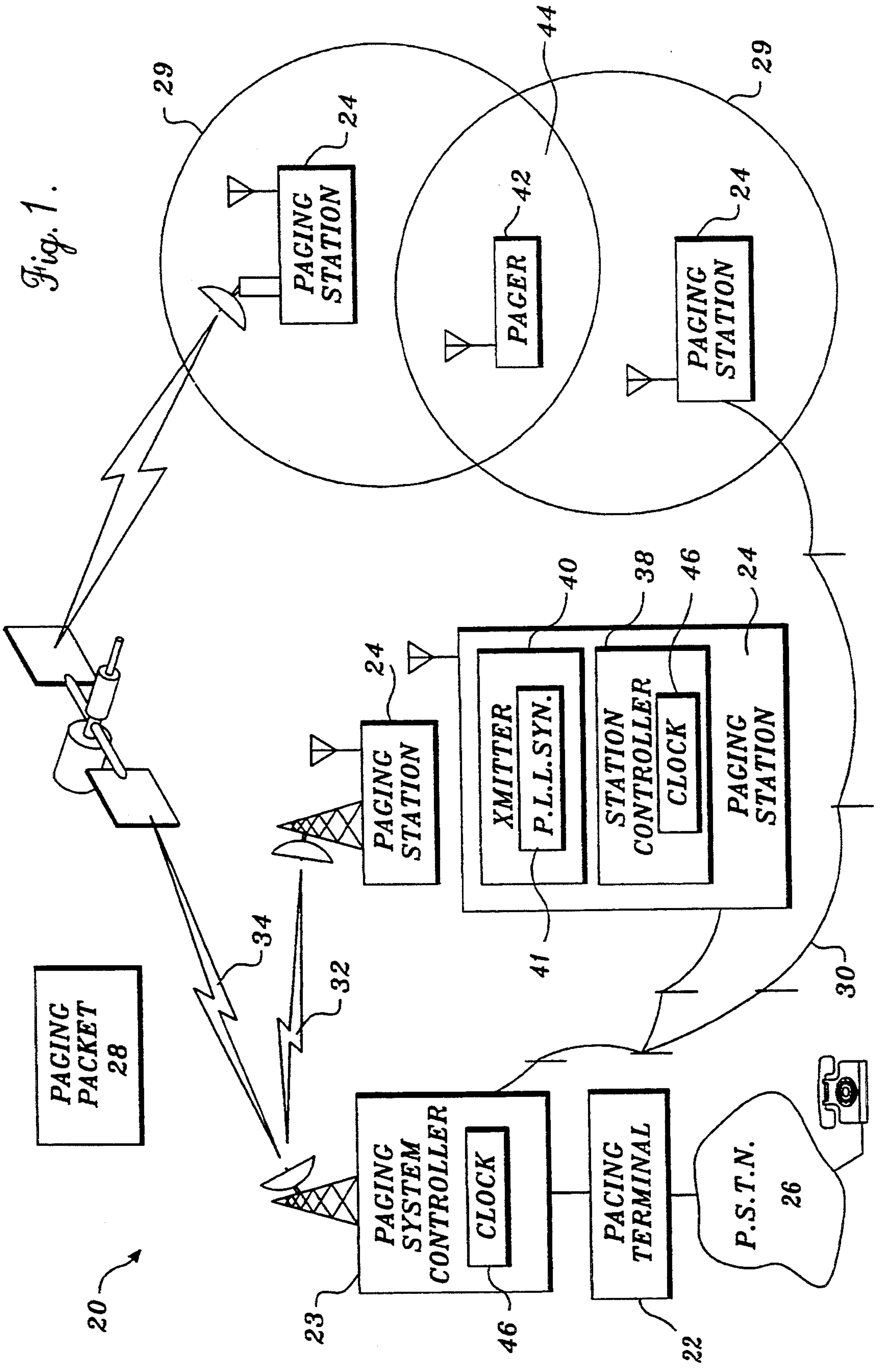
FIG. 1 is a block diagram of a paging system incorporating a clock synchronization system of this invention.

FIG. 1 illustrates a paging system 20 incorporating the clock synchronization system of this invention. Paging system 20 includes a paging terminal 22, a paging system controller 23, and a number of paging stations 24 that are spread over a wide geographic area. The paging terminal 22 is connected to the publicly switched telephone network (PSTN) 26 for receiving incoming telephone calls that comprise requests to page individuals who subscribe to the paging system 20. In response to the incoming calls, the paging terminal 22 creates pages. The pages are transmitted by the paging terminal 22 to the paging system controller 23. The paging system controller 23 bundles the pages into multipage page data blocks (PDBs) 28 that are forwarded to the paging stations 24. The paging stations 24, in turn, each broadcast the pages over a specific geographic area, as represented by circles 29 for two stations.

The actual method by which PDBs 28 are forwarded to the paging stations 24 depends on such factors as the structure of the paging stations, the distance to the paging stations, and/or the economics of employing specific forwarding systems. For example, some PDBs 28 can be forwarded over a hard wire or fiber-optic telephone link 30. Other paging stations 24 can receive the packets 28 over a microwave link 32, while still others can receive them over a satellite link 34. Paging stations 24 may, of course, receive PDBs 28 over two or more communication links. In the event one link fails, the others could be employed to ensure that the PDBs 28 are received. Alternatively, the multiple links can be employed to simultaneously send multiple copies of each PDB 28 to the paging stations 24; this allows processing equipment at the individual stations to use the information from each of the PDBs to correct for any transmission errors.

Each paging station 24, one of which is shown in detail, contains a station controller 38 and a transmitter 40. The station controller 38 receives the PDBs 28 from the paging system controller 23 and converts the paging information contained therein into a format so that it can be modulated for broadcast by the transmitter 40. The individual station controllers 38 are further configured to control the transmission of the pages so that all the transmitters 40 broadcast the same page at exactly the same instant. This ensures that when a pager 42, which is a receiver, is in an area where broadcasts from two or more paging terminals can be picked up, as represented by the overlapping area 44 between circles 29, the pager will essentially receive a single signal that can be readily processed. The station controllers 38 control the transmission of the pages contained in the PDBs 28 by the individual transmitters 40 so as to cause each transmitter to broadcast the pages contained within a single, common, PDB 28 at the same time. To ensure that the pages are broadcast simultaneously, the station controllers are each provided with a clock 46 and all the clocks are in synchrony. In other words, at the same instant, each clock 46 indicates the same time.

Figure 2:
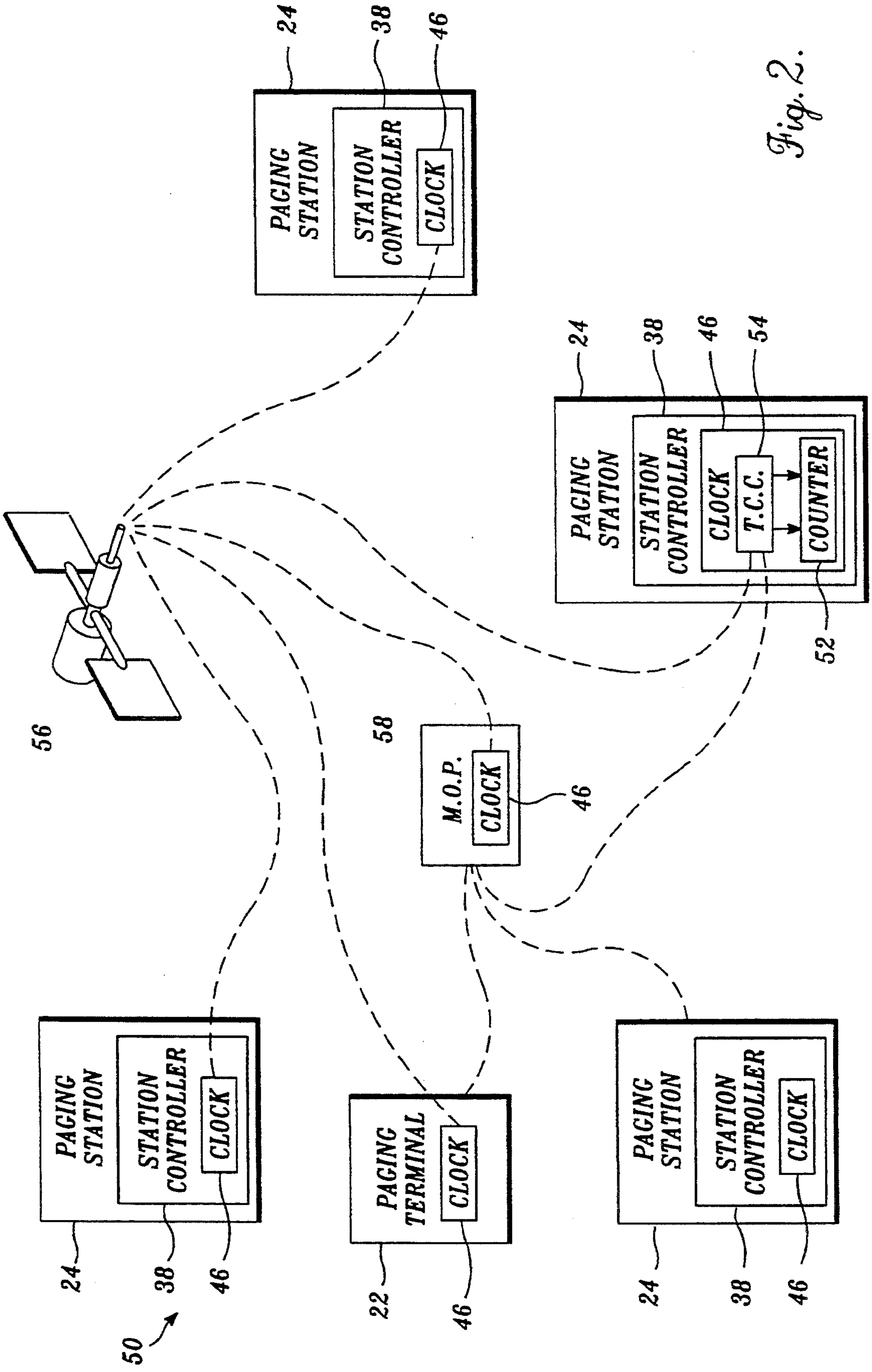
FIG. 2 is a block diagram of the clock synchronization system of this invention.

FIG. 2 illustrates in block diagram the clock synchronization system 50 of this invention. The clocks 46 at each paging station 24, as well as a clock 46 at the paging system controller 23, each include a counter 52 and a time counter controller 54. The counter 52 is the actual unit that generates the local-time signal that the station controller 38 uses to regulate the broadcast of the pages. The time counter controller 54 establishes the initial setting, the initial time indicated by the counter 52, and periodically sends a clocking signal to the counter so that the counter always generates an accurate local-time signal. The time counter controller 54 synchronizes the counter 52 by first periodically comparing the counter's local-time signal to a reference-time signal from a reference clock. As a result of this comparison, the time counter controller 54 first resets the counter 52 so that, at the conclusion of the synchronization process, the counter initially generates the correct local-time signal. The time counter controller 54 also adjusts the rate at which the clocking signal is sent to counter 52 to ensure that the counter continues to indicate an accurate local-time signal.

In some preferred embodiments of the invention, the time counter controllers 54 receive reference-time signals from global positioning system (GPS) satellites 56. These satellites generate highly accurate time signals. These satellites 56 are arranged so that, at any point on the earth, a ground station, such as a time counter controller 54, can receive the signals from at least one satellite. In locations where it is too expensive or physically difficult to provide a time counter controller 54 with GPS satellite-receiving equipment, the reference time comparisons are made with respect to the time maintained by a ground-located maintenance operation point (MOP) 58. Each MOP 58 contains a clock 46 that is synchronized with respect to the basic reference clock, the GPS satellite 56. The local-time signals generated by one or more of the clocks 46 located at the paging stations 24 are compared to the reference time maintained by the MOP 58. In some versions of the system 50 it is anticipated that the actual local/reference time comparisons will take place at the MOP 58. After each comparison, the MOP 58 sends each time counter controller 54 a signal indicating a time difference factor between the two times. The time counter controller 54 then uses the time difference factor to determine the extent to which the counter 52 initial state needs to be reset and the extent to which the clocking signal needs to be adjusted. The system 50 can further be configured so that a time counter controller 54 can either receive a reference time from a GPS satellite 56 or resynchronize the associated counter with respect to the reference clock associated with a maintenance operation point 58.

Figure 3:
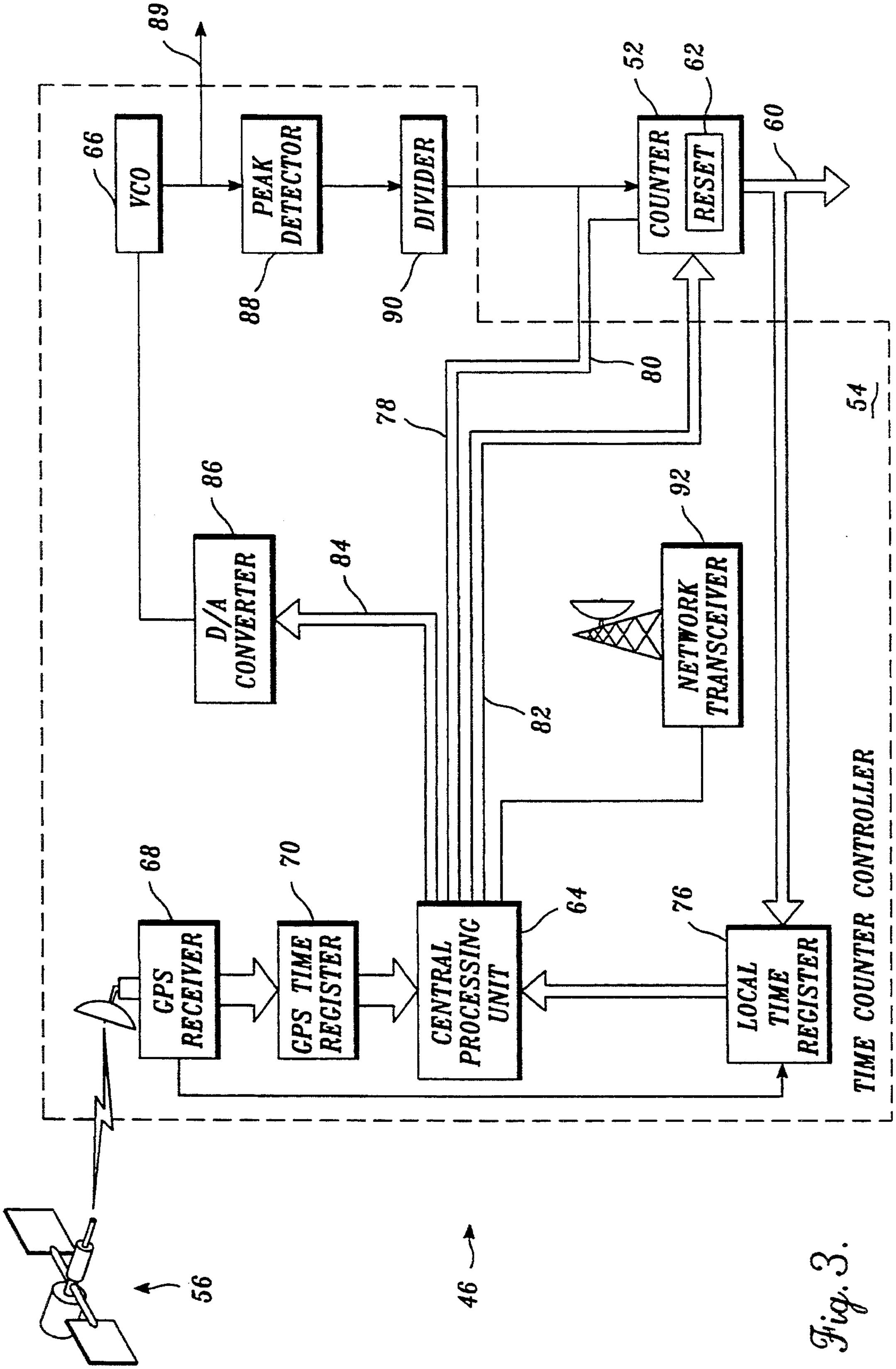
FIG. 3 is a block diagram of a single clock that is part of the clock synchronization system of this invention.

A clock 46 of this system 50 is describe, d in greater detail with reference to FIG. 3. The counter 52 is a 32-bit digital counter that is capable of advancing at a rate at least one order of magnitude faster than the designed accuracy rate of the clock. The counter 52 maintains a count in binary format, of the elapsed time in seconds, down to the microsecond (0.000001 second) since the start of a larger, preselected, fixed time period. In some versions of the system, the counter 52 is used to maintain an elapsed-time count for 60-minute periods that start on the beginning of the hour for an established reference-time standard. (The periods may start with the beginning of a new hour according to Greenwich Mean Time.) In other versions of the invention, the counter 52 is used to keep track of the elapsed time for periods that may, for example, be from 5 minutes to 80 minutes in length. The counter 52 generates an elapsed-time signal that is broadcast to other components of the station controller 38, not shown in this Figure, over a time bus 60. The station controller 38 components use the elapsed-time signals to regulate the advancement of their own internal counters that maintain a record of the period (i.e., the specific hour) for which counter 52 is recording the elapsed time. The station controller 38 combines the period count from its internal registers with the elapsed-time signal from the counter 52 to produce a combined hour and second clock signal that is accurate to one microsecond.

Associated with the counter 52 is a reset circuit 62. In FIG. 3 the reset circuit is shown as being integral with the counter 52. The reset circuit 62 monitors the elapsed time and, at the conclusion of a measuring period, resets the counter to zero with the next advancement signal. For example, when clock 46 is used to measure 60-minute periods, once the counter 52 indicates an elapsed time of 3599.999999 seconds, the reset circuit 62 will reset the counter to zero upon receipt of the next clocking signal.

The initial synchronization and subsequent advancement of the counter 52 are controlled by the time counter controller 54. The time counter controller 54 includes a central processing unit 64, such as a Motorola 68302 32-bit microprocessor, along with associated memory circuits, that compares the elapsed-time record of counter 52 with the reference time obtained from an external source. As a result of this comparison, the central processing unit 64 will reset the counter 52 elapsed time so that it is in synchronization with the reference time. The central processing unit 64 also controls the frequency of the output signal of a voltage-controlled oscillator (VCO) 66; this is the signal that is used to establish the clocking signal that is applied to the counter 52.

It is anticipated that clocks 46 incorporated into the synchronization system 50 of this invention will receive reference time signals from GPS satellites 56 currently in orbit. Once each second, these satellites 56 produce a 64-word (512 bit) time-mark message that includes a 24-bit time-of-day signal. This is the reference-time signal used by the time counter controller 54 to regulate the output of the counter 52. The time-of-day signal from a GPS satellite 56 indicates time down to the millisecond and is accurate to the microsecond. In other words, when a GPS satellite 56 generates a signal that indicates the time is 12 hours, 34 minutes, and 56.789 seconds, it is accurate to 12 hours, 34 minutes, and 56.789000 seconds.

The satellite reference time signal is monitored by a GPS receiver 68 that is part of the time controller circuit 54. A suitable GPS receiver 68 is the "NavCore V" receiver available from the Rockwell Corporation of Dallas, Tex. The GPS receiver 68 converts the time-of-day signal into a digital format that can be processed by the central processing unit. In FIG. 3 a 32-bit reference-time register 70 is shown as being the immediate recipient of a parallel-bit data stream from the GPS receiver 68 for temporarily storing the reference time data. This is for purposes of illustration only. In other versions of the system 50, the GPS receiver 68 can supply the reference time in either parallel or serial format directly to registers inside the central processing unit 64.

The central processing unit 64 compares the reference time to a local-time signal from the counter 52. The local-time signal is obtained from the counter 52 through a 32-bit local-time register 76. The local-time register 76 receives the elapsed time from the counter 52 over a branch of the time bus 60. The local-time register 76 latches upon receipt of a timing pulse signal that is generated by the GPS receiver 68. The GPS receiver 68 generates a timing pulse signal each time a time-mark message from the GPS satellite 56 is received.

The central processing unit 64 initially synchronizes the counter 52 by either performing a rapid increment or decrement of the elapsed time or establishing a new basic elapsed time. The incrementation or decrementation of the elapsed time is performed by the selective generation of either up count or down count clock pulses from the central processing unit 64 to the counter 52. The up count clock pulses are transmitted over an up count signal line 78 and the down count clock pulses are transmitted over a down-count signal line 80. The central processing unit 64 generates a preset initial elapsed-time count that is transferred from the central processing unit to counter data inputs, not shown, over a parallel-bit data stream bus 82.

The voltage-controlled oscillator 66 is regulated by a set of VCO control signals also generated by the central processing unit 64. In one preferred embodiment of the system 50, the central processing unit 64 generates a 14-bit VCO control word for establishing the frequency of the signal generated by the voltage-controlled oscillator. The VCO control word is transferred over a parallel data bus 84 to a digital-to-analog converter 86. The digital-to-analog converter 86 converts the VCO control word into a VCO control signal that is applied to the voltage-controlled oscillator 66. In one preferred version of the system the VCO control signal varies between 0 and 8 VDC.

The voltage-controlled oscillator 66 generates an oscillator output signal that has a frequency higher than the advancement, or accuracy, rate of the clock 46. For a clock 46 constructed to indicate time down to one microsecond, a voltage-controlled oscillator 66 that generates an output signal at 10 MHz, a cycle every 0.1 microsecond, is employed. A suitable oscillator 66 for producing this signal is the Isotemp Research, Inc. Voltage-Controlled Oscillator No. OCXO 134-10. This oscillator produces a variable-frequency output signal between 9,999,988 and 10,000,012 Hz. The frequency of the output signal from the oscillator 66 is directly proportional to the voltage of the VCO control signal.

The oscillator output signal is applied to a peak detector 88 that produces pulses at a rate equal to the frequency of the VCO output signal. The time counter controller 54 may also include an oscillator output branch line 89 over which the oscillator output signal is supplied to the paging station transmitter 40. The paging station transmitter 40 uses the oscillator output signal as a reference signal to regulate the frequency of the carrier signal that it produces. For example, in some preferred radio systems, each transmitter 40 includes a phase-locked loop synthesizer 41 (FIG. 1) that generates a signal that forms the basis for the carrier signal. The VCO output signal is supplied to the phase-locked loop synthesizer 41 over the branch line 89 to regulate the frequency of the carrier signal.

The clock signal produced by the peak detector 88 is applied to a divider 90. The divider 90 produces the actual counter clocking signals, upon receipt of a fixed number of pulses. In the described embodiment of the invention in which the peak detector generates pulses at a rate ten times the rate at which the counter 52 is intended to advance, the time counter controller 54 includes a divide-by-ten divider 90. This divider 90 generates a counter clocking signal after every tenth clock pulse is received. The clocking signals generated by the divider 90 are applied to the counter 52 over a branch of the up-count signal line 78. Each time the counter 52 receives a pulse, the counter increments the elapsed-time count by one unit.

The time counter controller 54 of FIG. 3 is further shown as having a network transceiver 92 connected to the central processing unit 64. The network transceiver 92 is a communications port through which commands and data are received by and transmitted from the central processing unit 64. As discussed hereinafter with respect to how clock synchronization is performed, by referring to a reference clock maintained by a MOP 58, one command that is sent to the time counter controller 54 through the transceiver 92 is an instruction to send a time mark signal; one type of data that is sent to the time counter controller through the transceiver is a time difference message that indicates the difference between the time as indicated by the counter 52 and the time as measured from a reference clock. The exact nature of the network transceiver 92 depends on the nature of the communications link between the various clocks of the synchronization system 50. In some systems 50, commands and data are transmitted over radio links; in these systems the transceiver 92 is an actual radio transceiver. In other systems 50 commands and data are exchanged over the publicly switched telephone network 26; in these systems a modem functions as the network transceiver 92. It should further be understood that the network transceiver may not be a distinct component. For example, in a paging system 20 in which the clock synchronization system 50 of this invention is incorporated, the transceiver over which the station controller 38 receives PDBs 28 and other commands and data may function as the network transceiver 92 for the time counter controller 54.

Figure 4:
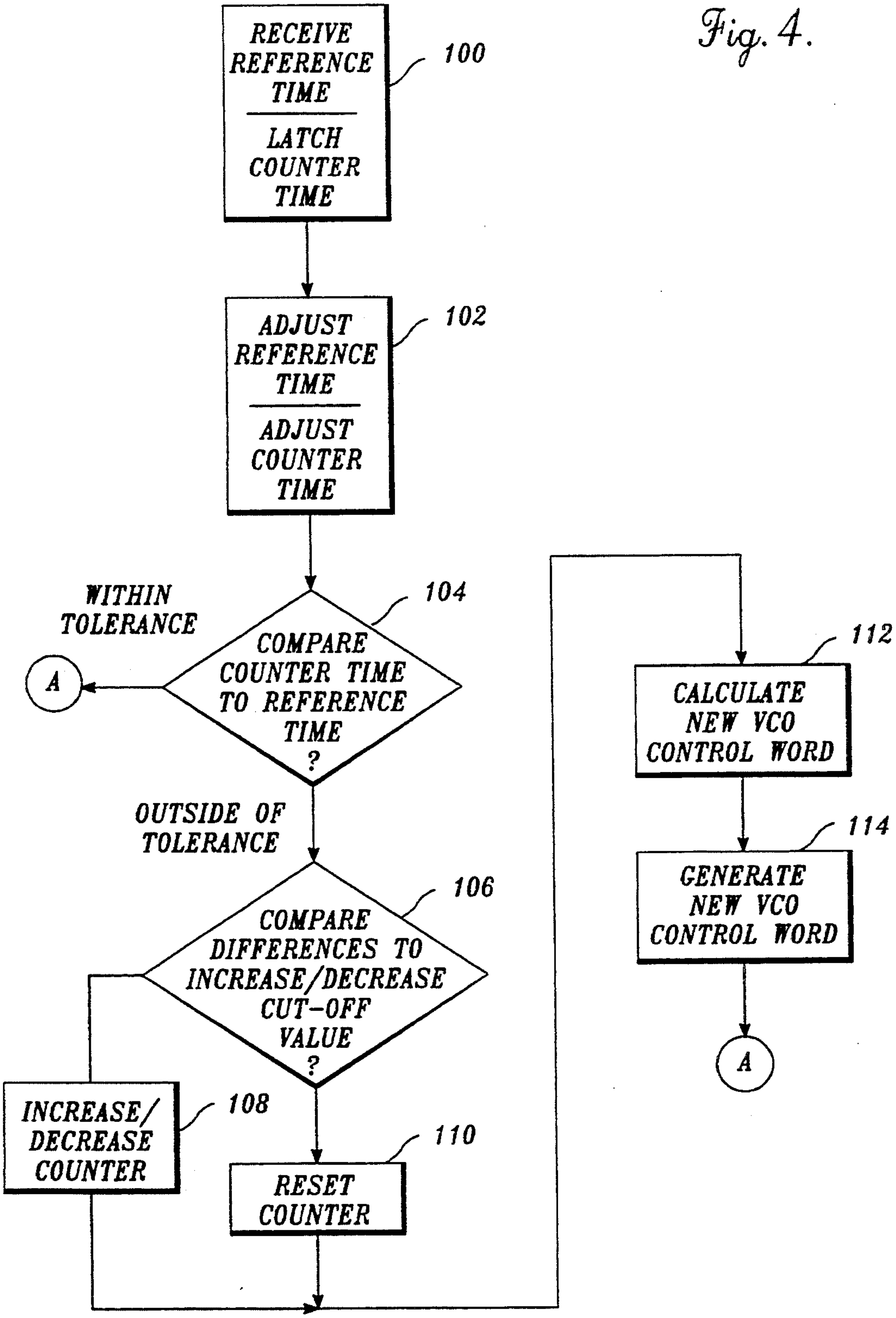
FIG. 4 is a flow chart of the process by which a clock of the synchronization system of this invention is synchronized.

The process by which the synchronization system 50 of this invention regulates a clock 46 is described with reference to the flow chart of FIG. 4. The clock synchronization process starts with the receipt of the time mark from the GPS satellite 56 by the GPS receiver 68 as depicted by step 100. Upon receipt of the time mark, the GPS receiver 68 generates a reference time signal that, while based on the time signal contained within the time mark, is adjusted to compensate for the satellite-to-receiver propagation delay. The reception of the time mark by the GPS receiver 68 causes the receiver to generate the time pulse signal, which causes the local register 76 to latch the elapsed-time measurement that is generated by the counter 52. Both the reference time signal from the GPS receiver 68 and counter me from the local-time register 76 are applied to the central processing unit 64. In an adjustment step 102 the counter time is similarly adjusted to account for any delays that occur between the receipt of the reference time by the receiver 68 and the latching of the time by the register 76.

Also, during the adjustment step 102, the reference time signal and the counter time signal are placed into a format so that they can be readily compared to each other. For example, the reference time signal is convened from a floating point representation into a fixed point number that is represented in binary format. Depending on the format of the counter time signal maintained by counter 52, an offset value may be added or subtracted to the counter time signal.

Following adjustment step 102 them is a comparison step 104 wherein the counter time is compared to the reference time to produce a time difference factor. If the time difference factor between the current counter time and the reference time is within a preselected tolerance value, there is no need to either reset the counter 52 or adjust the output signal of the voltage-controlled oscillator 66. The synchronization process is terminated until the next reference time signal is received. The tolerance value can be any preselected value within which it is intended that the clock 46 provide an accurate time. For example, if it is desired that the clock 46 be accurate within one microsecond, then the tolerance value should be one microsecond. If the clock 46 need only be accurate to three microseconds, then the tolerance value should be three microseconds.

If the difference between the counter time and the reference time is outside the tolerance value, then the clock in the system proceeds to synchronization and continues with a difference comparison step 106. In the difference comparison step 106, the time difference factor between the clock-time signal and the reference time is compared to a counter increment/decrement cutoff value to determine if the counter should be reset during either the incrementation or decrementation of the elapsed-time count or by the inputting of an entirely new elapsed-time count. In some preferred versions of the system the counter 52 is advanced at a single-microsecond rate; the cutoff value may be five microseconds. Counter time/reference-time differences of five microseconds or less are adjusted through the execution of an increment/decrement counter step 108. In the increment/decrement counter step 108 the central processing unit 64 generates either up-count or down-count commands to reset the counter 52. If the current time/reference-time difference is greater than five microseconds, the central processing unit 64 executes a reset counter step 110 and generates a new elapsed-time count that is loaded into the counter 52. The central processing unit 64 is capable of setting the counter through either steps 108 or 110 because, for smaller adjustments, it may be quicker to advance or retard the counter, whereas, for larger adjustments, it may be quicker to simply reset the elapsed-time count.

After the counter 52 is reset, the central processing unit 64 readjusts the voltage-controlled oscillator 66. The central processing unit 64 initially performs a calculate-new-setting step 112, wherein the central processing unit 64 determines the extent to which the frequency of the output signal of the oscillator 66 should be adjusted up or down. In situations in which the counter time is determined to be greater than the reference time, a VCO control word decreasing the speed of the oscillator output signal is calculated. In cases in which the counter time is less than the reference time, a VCO control word for increasing the frequency of the oscillator output signal is calculated. The increase or decrease of the frequency of the oscillator output signal varies proportionally with the absolute magnitude of the time difference factor between the counter time and the reference time.

One method of calculating the new VCO control word involves first mathematically calculating a VCO setting for theoretically perfectly correcting for the oscillator output drift, and then from that calculation, generating a new control word that corrects for only a portion of the drift. For example, in a version of an invention having a VCO 66 producing an output signal centered at 10 MHz that can be adjusted $\pm 12$ Hz, if, over an hour's period of time, the measured difference between the counter time and reference time is 27 microseconds, theoretically the VCO output signal should be adjusted by 0.075 Hz to produce a perfectly corrected signal upon which the clocking signal can be based. However, instead of generating a new VCO control word to either increase or decrease the VCO output signal by 0.075 Hz, according to this method the VCO control word would be adjusted so as to cause the generation of VCO output that is 0.0375 Hz higher or lower than its predecessor. An advantage of this less-than-perfect correction is that it reduces the likelihood of overcompensating for any drift in the oscillator output. It should be understood that, in the foregoing example, the adjustment to produce an oscillator output signal that is only corrected by 50% of the theoretical perfect correction is merely illustrative. In other versions of the invention, the final adjustment of the VCO control signal may be for a different percent of the theoretical perfect correction. In some versions of the invention, the adjustment of the VCO control word as a percentage of the theoretically perfect adjustment may vary.

After the calculate-new-setting step 112 is executed, the central processing unit 64 then executes a generate-VCO-control step 114. In this step 114 the central processing unit 64 forwards the newly calculated VCO control word to the digital-to-analog converter 86. On receiving the new VCO control word, the digital-to-analog converter 86 produces a new VCO control signal that is applied to the oscillator 66. In response to the receipt of the new VCO control signal, the oscillator 66 produces a new output signal with slightly changed frequency to either increase or decrease the rate at which the counter 52 advances.

In some versions of this invention the oscillator 66, in addition to producing the signal that controls the rate at which the counter 52 advances, is also used to produce an offset reference signal for regulating the carrier signal produced by the paging station transmitter 40. An offset reference signal is produced because, in some paging systems 20, it may be desirable to have the individual paging station transmitters 40 broadcast at carrier frequencies that are slightly offset from each other. The carrier frequencies of the paging station transmitters 40 are slightly offset from each other in order to minimize the occurrence of static null points. A null point is a location where two paging signals are exactly out of phase. At these locations pager 42 will not receive any intelligible signals. A static line of null points can develop along the line where the paging signals sent by two paging station transmitters 40, both of which are operating at exactly the same frequency, are received and are out of phase with each other. Fixed, or static, null points are eliminated by offsetting the carrier frequencies of the paging station transmitters 40. Nulls will still develop. However, the nulls will vary in location over the area in which they develop and, at any given location, a null will be present for only a small percentage of time. Thus, a pager 42 located at such a location will usually receive paging signals.

In order to eliminate the development of static null points, it is desirable to provide the paging system 20 with paging transmitters that have carrier frequencies that are slightly offset from one another. For paging transmitters 40 that do not have internal frequency offset adjustments, the offset frequency may be provided by adjusting the frequency of the output signal from the voltage-controlled oscillator 66. The adjustment of the voltage-controlled oscillator 66 can be performed by having the central processing unit 64 modify the VCO control word so that the oscillator is operated at a frequency X Hz above or below the basic carrier frequency of the paging system 20. For example, the voltage-controlled oscillator 66 associated with a first paging station 24 can be set to run at a base frequency of 10,000,002 Hz; a second oscillator associated with a second paging station can be set to run at a frequency of 10,000,000 Hz; and a third oscillator associated with a third paging station can be set to run at a frequency of 9,999,998 Hz. This offset adjustment of the base, or carrier reference, frequencies of the clocks 46 causes the individual transmitters 40 associated with the clocks to broadcast pages over carrier frequencies that are proportionally offset from each other. This offset adjustment of the output frequency of the voltage-controlled oscillator 66 does have one unintended effect. Since the output frequency of the oscillator controls the rate at which advancement signals are applied to the counter 52, the offset frequency would cause the counter to advance at a rate that is either slower or faster than the normal advance rate. In a multiple clock 46 system, the individual counters 52 advance at different rates. Consequently, after an initialization, owing to the different advancement rates, the individual counters 52 start to indicate different clock times.

Figure 5:
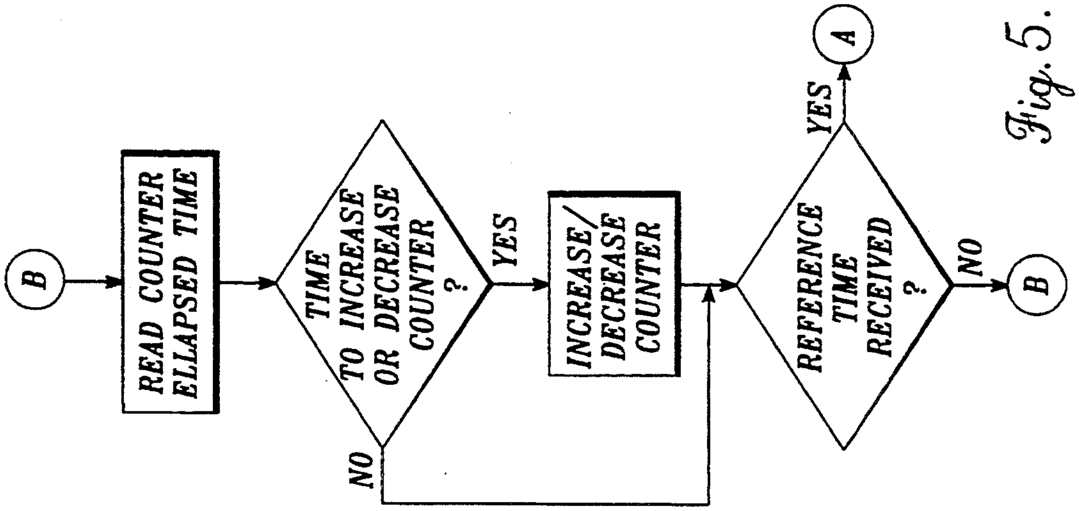
FIG. 5 is a flow chart of the process by which the clock synchronization system of this invention adjusts for any offset in the advancement signals used to control the advancement of the clocks of this invention.

The clock synchronization system 50 of this invention compensates for the increased or decreased advancement of the counter 52 caused by the offset frequency adjustment of the voltage-controlled oscillator 66. The central processing unit 64 contains a set of instructions that causes the central processing unit to periodically increment or decrement the counter 52 in order to adjust for a clock signal rate that is either slower or faster than the intended advancement rate. FIG. 5 represents the process by which adjustment occurs. The central processing unit continually reads the elapsed-time signal from the counter 52, as represented by step 120, to determine how much time has elapsed since the beginning of a new offset readjustment period. This offset readjustment period is based upon the reciprocal of the difference between the offset frequency and the base frequency of the system 50. For example, if the base frequency is 10,000,000 Hz and the offset frequency is 10,000,002 Hz, the offset adjustment period is 500 milliseconds. Once the central processing unit 64 has determined that the elapsed time has reached the end of an offset adjustment period, represented by the time to increment/decrement counter step 122, the central processing unit 64 automatically sends a down-count clock pulse over the down-count signal line 80 to the counter 52 to decrease the total elapsed-time count by 1 as represented by the increment/decrement counter step 124. The offset adjustment serves to reset the counter 52 so that the counter indicates the actual elapsed time as if it had been advanced by basic clocking signals, not a signal that was generated as a consequence of an offset adjustment applied to the voltage-controlled oscillator. After the increment/decrement counter step 124, the central processing unit 64 continues to wait for the receipt of a reference-time signal as depicted by step 126. If no such signal has been received, the central processing unit 64 continues to monitor the total elapsed time until the end of the next offset adjustment period. If the referencetime signal is received by the central processing unit 64, the central processing unit then proceeds to perform the reference-time comparison and, if necessary, the subsequent resynchronization of the counter and readjustment of the voltage-controlled oscillator as described with reference to FIG. 4.

Figure 6:
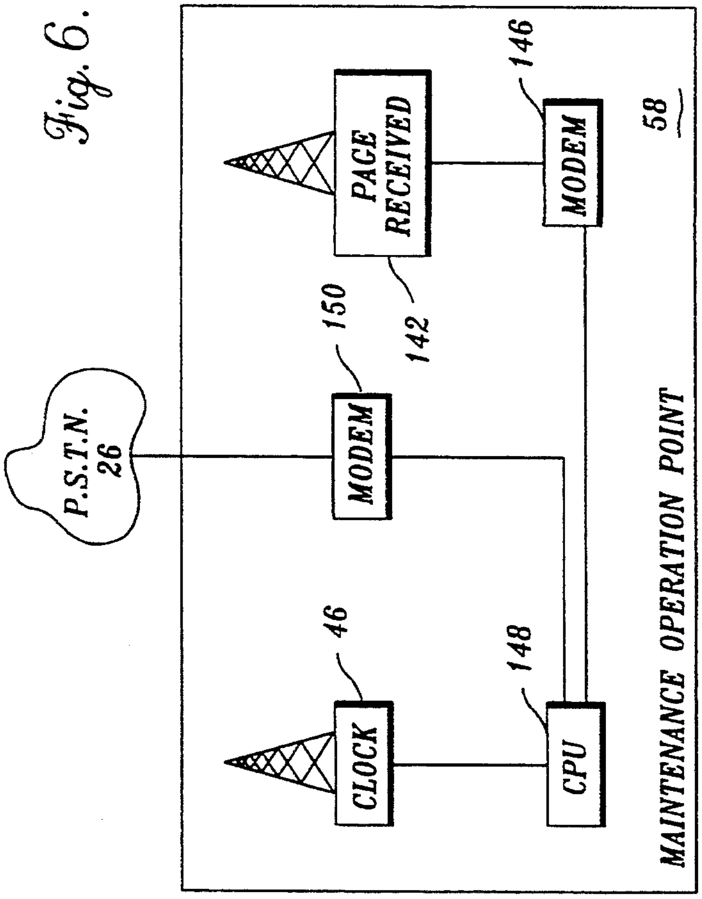
FIG. 6 is a block diagram illustrating the primary components of a maintenance operation point of the clock synchronization system of this invention.

As previously discussed, a maintenance operation point, a MOP 58, can be used to compare the time from one or more of the clocks 46 to the reference time. Ideally, the MOP 58, now described with reference to FIG. 6, is located where the pages broadcast by two or more paging stations 24 can be received. The MOP 58 includes a receiver 142 for receiving the pages that are broadcast by the paging stations 24. A suitable receiver 142 is the MASTR II receiver manufactured by the General Electric Company of Lynchburg, Va. The signals received by the receiver 142 are convened into digital signals by a modem 146. A suitable modem 146 to perform this task is the AM 7910 modem manufactured by Advanced Micro Devices of Sunnyvale, Calif. In one preferred embodiment of this invention, modem 146 is operated at a 976.6 baud rate. The paging signals received by the MOP 58 are monitored by a central processing unit (CPU) 148 connected to receive the output signals from the modem 146. The MOP central processing unit 148 has a universal asynchronous receiver-transmitter, not illustrated, that converts the serial-bit data stream from the modem 146 into a parallel-bit data stream suitable for processing by the actual processing elements of the central processing unit.

The maintenance operation point 58 further includes a modem 150 through which commands and data are exchanged with other elements of the paging system 20 over the PSTN 26. In one preferred version of the invention, the maintenance operation point 58 exchanges data and commands only with the paging system controller 23. The paging system controller 23 then forwards specific commands and data to the individual paging stations 24. These commands and data are exchanged with the paging stations through the network transceivers 92 associated with the individual stations. In another preferred version of the invention, the MOP 58 exchanges data and commands directly with one or more of the paging stations that it is designed to monitor. In either version of the invention, the MOP central processing unit 148 may be provided with dial-up capabilities so that it can selectively access the complementary system component with which it has a need to exchange data. This eliminates having to provide a dedicated communications link to the MOP 58. In other versions of the invention, the MOP 58 may exchange maintenance data with other components over a radio channel. It should further be understood that, when a particular maintenance operation point 58 is used to monitor the performance of multiple paging stations 24, the system 20 directs the shutdown of the adjacent stations so that the MOP 58 receives the signals from only the one station. This allows the maintenance operation point 58 to monitor the performance of that station without interference from signals transmitted by other stations. Typically, the system shuts down these stations during periods of time when paging traffic is light.

The maintenance operation point 58 further includes a clock 46 identical to the other clocks 46 that are part of the synchronization system 50 of this invention for monitoring the performance of clocks that are not provided with GPS receivers 68. The MOP clock 46 supplies the current time to the MOP central processing unit 148. The MOP central processing unit 148 compares the current time from its clock 46 to the time marks received from the clocks 46 of the paging stations 24 with which it is associated. The results of these comparisons, the time difference factors, are transmitted back to the clock's central processing unit 64 at the paging station, which uses this information to resynchronize the paging station's clock 46.

Figure 7:
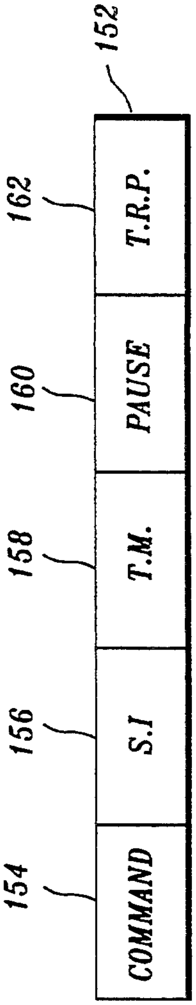
FIG. 7 illustrates the format of one type of time information command that may be sent to the maintenance operation point according to this invention.

The time marks from the paging stations 24 are transmitted in the form of time information commands 152, one of which is illustrated in FIG. 7. A time information command 152 starts with a command field 154. The command field 154 contains a code that indicates that the command is a time information command 152 with a time mark and that the MOP central processing unit 148 should initiate the time comparison process. The command field 154 is followed by a site identification (SI) field 156. The site identification field 156 contains an indication of which paging station 24 is sending the time information commands 152. A time mark (TM) field 158 follows the site identification field 156. The time mark field 158 indicates the time, from the paging station clock 46, when the time information command 152 was generated. A pause 160 follows the time mark field 158. The pause 160 in data transmission is sent to allow the MOP central processing unit 148 to get ready to receive the time mark, which is actually sent as a time recognition pattern (TRP) 162. This is a specific pattern of signals that the MOP central processing unit 148 recognizes as the time mark. For example, the pattern can be a set of bit transitions, such as is found in a 001100110011 binary code pattern.

The individual paging station controllers 38 periodically form time information commands 152 for transmission to the associated maintenance operation point 58. In some preferred embodiments of the invention, system control equipment in the paging system controller 23 instructs each station controller 38 when to send a time information command 152. At the same time, the paging system controller 23 will further direct the other station controllers to stop transmissions from their paging stations 24. This prevents signals from the other paging stations 24 from interfering with the reception of the time Information command 152 by the maintenance operation point 58. When the station controller creates the time information command 152 it may add approximately 10 to 25 microseconds to the time value from the clock 46 into the time value written into the time mark field 158. This is to compensate for the period from the beginning of the transmission of the command 152 to the transmission of the time recognition pattern 162.

Upon receipt of the time information command 152, the MOP central processing unit 148 waits for the bit transitions contained in the time recognition pattern 162. Each transition causes the MOP central processing unit 148 to read the current time from the MOP clock 46. The times at which the bit transitions were received are then averaged to determine the exact time at which the time mark was received. The MOP central processing unit 148 then computes the time difference factor for the period between when the time mark was received and the time according to the MOP clock 46. This time difference factor is adjusted for a path delay time, which is the period between transmission of the time mark and its receipt by the MOP central processing unit 148. The path delay actually comprises the transmission delay, the time it takes for the paging station transmitter 40 to send the time information command 152; the air time between the transmitter and the MOP antenna 144; and the MOP receiver 142 and modem 146 processing delay. Once the time difference factor is adjusted, it is forwarded to the modem 150 for transmission to the appropriate paging station time counter controller 54. Upon receipt of the difference signal, the time counter controller central processing unit then resets the counter 52 and/or readjusts the voltage-controlled oscillator 66 as may be appropriate.

The clock synchronization system 50 of this invention provides a convenient means to both set a number of clocks, so that they will indicate an initial time that is related to a reference clock, and control the advancement of the clocks, so they all advance at the same rate. Thus, all the clocks that are pan of the system run in parallel with a reference clock. One reference clock to which the individual clocks that form this system are all synchronized is the clock contained in the GPS satellite 56. A reference time signal from the GPS satellite 56 can be received by either the clocks 46 themselves or the maintenance operation points 58 associated therewith. There is no need to establish any type of land link between a reference clock and the system clocks 46 or between the system clocks 46 and the maintenance operation points 58 with which they may be associated. Consequently, the synchronization system 50 of this invention does not require the assignment of increasingly scarce radio frequencies or construction of some type of expensive hard wire link between the reference clock and the system clocks 46. Moreover, there is no need to provide a hard wire link between the reference clock and system clocks 46. This makes the system 50 of this invention well suited to synchronize portable clocks 46, including clocks that are used while they are motion.

Figure 8:
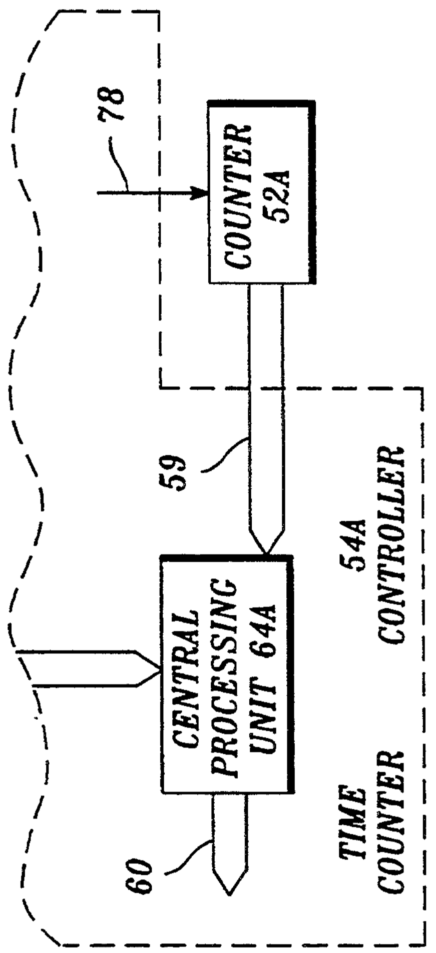
FIG. 8 is a partial block diagram of an alternative clock that is pan of the clock synchronization system of this invention.

As depicted by FIG. 8, in an alternative embodiment of the invention, the actual clock time may not be maintained by a counter 52*a*. Instead, in this embodiment of the invention, counter 52*a* may simply be an elapsed time counter that generates an elapsed time signal that is forwarded directly to a central processing unit 64*a* over a data bus 59. For example, in one version of this embodiment of the invention, counter 52*a* may be a one-minute counter that is accurate to the microsecond. The central processing unit 64*a* calculates the clock time by adding or subtracting a counter offset value to the elapsed time received from the counter 52*a*. The counter offset value is a scalar factor that is always held in storage by the central processing unit 64*a*. The central processing unit 64*a* then forwards the calculated time signal to the other station controller 38 components over a time bus 60*a*.

In this embodiment of the invention, during the initial stages of the clock synchronization process, the GPS receiver 68 forwards the time pulse signal to the central processing unit 64*a*, connection not shown, to trigger the storage of the most current calculated time by the central processing unit. The central processing unit 64*a* compares the calculated time with the reference time from the GPS receiver 68. On the basis of this comparison, the central processing unit 64*a* updates the counter offset value so that it reflects the most accurate difference between the counter elapsed time and the reference time. The central processing unit 64*a* also, in a manner similar to that described with respect to FIG. 4, generates a new VCO control word to adjust the rate at which the counter 52*a* is advanced.

In versions of this embodiment of the invention used to generate an offset reference signal for forwarding to the paging system transmitters 413, the individual central processing units 64*a* adjust the counter offset values associated therewith to compensate for the offset advancement of the counters 52*a*. These adjustments are in the form of a periodic incrementation or decrementation of the counter offset values that occur independently of the resynchronization of the clocks.

An advantage of this embodiment of the invention is that it eliminates the need to provide a counter that can be reset either incrementally by signals over up- and down-count lines or in their entirety by signals over a parallel data bus. Another advantage of the clock of this invention is that the central processing unit 64*a* can calculate the clock time more rapidly than it can receive the clock time from a counter. In versions of the invention wherein the central processing unit 64*a* performs functions other than controlling the advancement of the counter 52*a*, this makes the most current clock time more readily available. Consequently, the central processing unit 64*a* is able to execute the other functions it is intended to perform at a time more closely matching the precise moment when those functions are to be performed.

The foregoing detailed description has been limited to specific embodiments of the invention. It will be apparent, however, that variations and modifications can be made to this invention with the attainment of some or all of the advantages thereof. For example, in some versions of the invention, counter 52 or counter 52*a* may be replaced by gate arrays that generate output signals to indicate current time readings. In these embodiments of the invention the divider may be incorporated integrally into the gate array. Also, the up and down count signals used to incrementally modify the clock time signal maintained by the gate array will be directly connected to the gate array. In still other embodiments of the invention the divider may be eliminated. In a version of this embodiment of the invention wherein the VCO 66 generates a 10 MHz signal the counter would advance at a 100 nanosecond rate. Other versions of the invention may not include a set of up and down count lines between the central processing unit 64 and the counter 52 to incrementally advance or retard the counter. In these versions of the invention a switching circuit may be attached to the divider 90 to cause undivided clocking signals from the peak detector 88 to be directly applied to the counter 52 to rapidly advance it; the switch may also be constructed to prevent signals from the peak detector from being applied to the divider to, in turn, stop the divider from generating clocking signals so as to retard the advancement of the counter.

Furthermore, reference clocks other than those maintained by the GPS satellite 56 may be used to provide reference clock signals. For instance, one could provide a local clock synchronization system 50 of this invention, wherein a reference-time signal is broadcast from a low-power transmitter to a number of clocks located nearby. Each of the time counter controllers 54 of this system would include a complementary receiver for picking up the reference-time signals. This system could be used when it is necessary to provide a number of very accurate clocks in one location for a short period of time. For example, it may be utilized for seismic explorations.

Furthermore, it should also be understood that the exact structure of the time information command 152 that may be transmitted between a system clock 46 and a complementary maintenance operation point 58 is similarly meant to be illustrative and not limiting. For example, some commands may be formatted so that a command word will be immediately followed by a time recognition pattern. In these versions of the invention the time mark would follow the time recognition pattern. Alternatively, some commands may be self clocking. This means that each time information command 152 may not include a specific command directing the MOP 58 to initiate the time comparison process. Instead, the MOP 58 may be configured to automatically start the time comparison process for a particular paging station 24 upon receipt of a time mark signal from that station. Also, while, in this version of the invention, the clocks 46 have been shown as being separate from the other components with which they are used, it should, of course, be understood that this is for purposes of illustration and not meant to be limiting. It may, for example, be desirable to build a clock into a system, e.g., building it into a station controller 38 of a paging station 24. Such assembly may make sense for efficient and economic use of components to have the processor that controls the operation of the station further serve as the processor that controls the resynchronization of the clock counter and the resetting of the voltage-controlled oscillator 66 that advances the counter.

Similarly, it should be understood that, while, in the described version of the invention, this synchronization system 50 is part of a paging system 20, it can be used in other environments. For example, the system 50 may be used to synchronize clocks that are part of a two-way simulcast system, a telemetry system, a dam acquisition system, or a system intended to exchange dam with mobile receivers. Therefore, it is the object of the appended claims to cover all such variations as come within the true spirit and scope of the invention.

The embodiments of the invention in which an exclusive property or privilege is claimed are defined as follows:

1. A simulcast network comprising:

a plurality of transmitters, each transmitter including a clock having:

(i) a sequentially advanceable counter for maintaining a local time value in response to a clocking signal;

(ii) a signal generator for producing said clocking signal for application to said sequentially advanceable counter;

(iii) a local time value processing circuit, connected to said sequentially advanceable counter, for producing a local time based on said local time value;

wherein at least two of said signal generators corresponding to at least two of said clocks produce different clocking signals so that said sequentially advanceable counters associated therewith advance at different rates; and wherein said local time value processing circuits associated with said at least two of said signal generators are configured to produce local times that are substantially identical to each other.

2. The simulcast network of claim 1, wherein said clocking signals are variable frequency signals and said signal generators produce said clocking signals at different frequencies.

3. The simulcast network of claim 1, wherein each said sequentially advanceable counter maintains elapsed time counts, said local time value processing circuits maintain separate counter offset values for combining with said elapsed time counts to produce said local time, and said local time value processing circuits periodically incrementally change said counter offset values so that said local time signals are periodically substantially identical with each other.

4. The simulcast network of claim 3, wherein said clocking signals are variable frequency signals, and said signal generators produce said clocking signals at different frequencies.

5. The simulcast network of claim 1 wherein the time value processing circuits are operative to periodically selectively adjust said sequentially advanceable counters associated with said at least two of said signal generators to produce time values that are utilized by said time value processing circuits associated with said at least two of said signal generators to produce local times that are substantially identical to each other.

6. A simulcast network comprising:

(a) a plurality of radio transmitters for broadcasting radio signals at a carrier frequency, each transmitter including a carrier frequency control circuit for establishing said carrier frequency of each said transmitter, wherein said carrier frequency control circuit establishes said carrier frequency based on a clocking signal; and (b) a plurality of clocks, wherein each one of said plurality of clocks is associated with a corresponding transmitter of said plurality of radio transmitters, each clock including:

(i) a sequentially advanceable counter for maintaining a time value in response to said clocking signal;

(ii) a signal generator for producing said clocking signal for application to said carrier frequency control unit and said sequentially advanceable counter; and (iii) a time value processing circuit connected to said sequentially advanceable counter for producing a clock time based on said time value;

wherein at least two of said signal generators associated with at least two of said clocks produce different clocking signals so that said sequentially advanceable counters associated therewith advance at different rates and so that said transmitters associated therewith broadcast at different carrier frequencies; and wherein said time value processing circuits associated with said at least two of said signal generators are configured to produce clock times that are substantially identical to each other.

7. The simulcast network of claim 6, wherein said sequentially advanceable counters maintain clock times that serve as a basis for said time signals, and said time value processing circuits periodically adjust said sequentially advanceable counters so that said clock times are periodically substantially identical to each other.

8. The simulcast broadcast network of claim 6, wherein said clocking signals are variable frequency signals, and said signal generators produce said clocking signals at different frequencies.

9. The simulcast network of claim 6, wherein said sequentially advanceable counters maintain elapsed time counts; said time value processing circuits maintaining separate counter offset values for combining with said elapsed time counts to produce time signals; and said time value processing circuits periodically incrementally changing said counter offset values so that said time signals are periodically substantially identical with each other.

10. A simulcast network synchronized to a reference clock, said reference clock transmitting a reference time signal, said simulcast network broadcasting a data signal substantially simultaneously, said simulcast network comprising:

(a) a plurality of transmitters spaced apart over a geographic area; and (b) a plurality of clocks, each one of said clocks associated with one of said plurality of transmitters, wherein each one of said clocks includes:

(i) a sequentially advanceable counter that maintains a clock time in response to a periodic clocking signal and provides a clock time signal corresponding to the clock time;

(ii) a difference calculating circuit including a first receiving circuit for receiving the reference time signal, said reference time signal indicating a reference time, and a second receiving circuit for receiving said clock time signal, said difference calculating circuit determining a time difference factor as a function of a difference between said reference time and said clock time and transmitting said time difference factor to a clock synchronization circuit, said clock synchronization circuit directing said sequentially advanceable counter to indicate a new clock time when said time difference factor is received; and (iii) a time counter controller having a counter advance circuit connected to said sequentially advanceable counter for generating said periodic clocking signal, said clock synchronization circuit being connected to said counter advance circuit and when said time difference factor is received said clock synchronization circuit selectively directing said counter advance circuit to change the frequency of said clocking signal;

whereby said plurality of clocks synchronize their respective clock time signals to said reference time signal and said transmitters broadcast said data signal at substantially the same time and further wherein said clock synchronization circuits of at least two clocks are configured so as to cause said counter advance circuits associated therewith to generate clocking signals that are different from each other, so as to cause said counters to advance at different rates, and said clock synchronization circuits of said at least two clocks are configured to selectively adjust said sequentially adjustable counters associated therewith so that said clock time signals are modified so as to at least periodically be substantially identical to each other.

* * * * *